(12) United States Patent
Watarai

(10) Patent No.: US 7,484,600 B2
(45) Date of Patent: Feb. 3, 2009

(54) BICYCLE DISK BRAKE CALIPER WITH A RECURSIVE COOLING SYSTEM

(75) Inventor: Etsuyoshi Watarai, Izumi (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 0 days.

(21) Appl. No.: 11/424,658

(22) Filed: Jun. 16, 2006

(65) Prior Publication Data

US 2007/0289822 A1   Dec. 20, 2007

(51) Int. Cl.
*F16D 55/22*    (2006.01)
*B62L 5/00*     (2006.01)

(52) U.S. Cl. .............. 188/26; 188/71.6; 280/288.4

(58) Field of Classification Search .......... 188/71.6, 188/26, 251 A
See application file for complete search history.

(56) References Cited

U.S. PATENT DOCUMENTS

| 3,420,342 | A  * | 1/1969 | Botterill ............. 188/264 F |
| 5,031,511 | A  * | 7/1991 | Villata ................. 92/128 |
| 5,649,746 | A    | 7/1997 | Stewart, Jr. |
| 6,170,617 | B1   | 1/2001 | Nakamura |
| 6,196,358 | B1   | 3/2001 | Nakamura |
| 6,202,802 | B1   | 3/2001 | Nakamura |
| 6,321,880 | B2 * | 11/2001 | Nakamura ............. 188/71.6 |
| 6,401,882 | B1 * | 6/2002 | Ueda et al. ........... 188/264 G |
| 2001/0009213 | A1 * | 7/2001 | Nakamura ............. 188/26 |
| 2003/0010585 | A1 * | 1/2003 | Okada et al. .......... 188/251 A |

FOREIGN PATENT DOCUMENTS

DE    10149411 A1    4/2003

OTHER PUBLICATIONS

European search report for EP 07007763.1, the European application that corresponds to this application, dated Nov. 30, 2007.

* cited by examiner

*Primary Examiner*—Robert A Siconolfi
*Assistant Examiner*—Mahbubur Rashid
(74) *Attorney, Agent, or Firm*—James A. Deland

(57) ABSTRACT

A bicycle brake disk caliper apparatus comprises a caliper housing, a piston operatively coupled to the caliper housing so that the piston moves between a brake release position and a brake activating position, a hydraulic inlet for receiving a hydraulic fluid to move the piston, a piston activating space in fluid communication with the hydraulic inlet so that the hydraulic fluid moves the piston from the brake release position to the brake activating position, a cooling member, a cooling inlet in fluid communication with the hydraulic inlet, a heat transfer space in fluid communication with the cooling inlet, and a cooling outlet in fluid communication with the heat transfer space for communicating hydraulic fluid from the heat transfer space so that at least a portion of hydraulic fluid flows only one way from the hydraulic inlet, through the cooling inlet, and through the heat transfer space.

13 Claims, 6 Drawing Sheets

BICYCLE DISK BRAKE CALIPER WITH A RECURSIVE COOLING SYSTEM

BACKGROUND OF THE INVENTION

The present invention is directed to bicycles and, more particularly, to a bicycle disk brake caliper.

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle that has been extensively redesigned over the past years is the braking system.

There are several types of bicycle brake devices currently available on the market. Examples of some types of common bicycle brake devices include rim brakes, caliper brakes and disc brakes. If a rider wants a very high performance brake system, then the rider typically wants a disc brake system. Disc brake systems provide substantial braking power in relationship to the amount of braking force applied to the brake lever. Moreover, disc brake systems typically provide a high level of braking consistency in all types of weather and riding conditions. However, one problem with disc brakes is that the hydraulic or actuating fluid can become overheated such that vapor-lock occurs. In other words, the heat generated by braking results in the hydraulic fluid increasing in volume so as to cause the brake pads to engage the brake disc even when the brake lever is in the release position.

In prior art disc brake systems, several methods have been used to avoid vapor-lock. For example, the caliper housing may be made larger to absorb more heat, a larger brake disc with a wider surface area may be used to dissipate more heat, or brake or friction pads which do not transfer the heat to the caliper housing as readily as conventional friction pads may be used. Vapor-lock also can be suppressed by using high quality hydraulic fluid. Other known systems provide separate cooling systems that circulate a cooling fluid through a cooling chamber that is either attached to the caliper housing or formed as part of the caliper housing. However, none of the systems optimally cool the hydraulic fluid used to operate the brake.

SUMMARY OF THE INVENTION

The present invention is directed to various features of a cooling system for a bicycle disk brake caliper. In one embodiment, a bicycle brake disk caliper apparatus comprises a caliper housing dimensioned and structured to be mounted to a bicycle, a piston operatively coupled to the caliper housing so that the piston moves between a brake release position and a brake activating position, a hydraulic inlet for receiving a hydraulic fluid to move the piston, a piston activating space in fluid communication with the hydraulic inlet so that the hydraulic fluid moves the piston from the brake release position to the brake activating position, a cooling member, a cooling inlet in fluid communication with the hydraulic inlet, a heat transfer space in fluid communication with the cooling inlet for engaging hydraulic fluid received through the cooling inlet with the cooling member, and a cooling outlet in fluid communication with the heat transfer space for communicating hydraulic fluid from the heat transfer space to a location so that at least a portion of hydraulic fluid flows only one way from the hydraulic inlet, through the cooling inlet, and through the heat transfer space. Additional inventive features will become apparent from the description below, and such features may be combined with the above features to provide additional benefits.

DETAILED DESCRIPTION OF THE EMBODIMENTS

Figure 1:
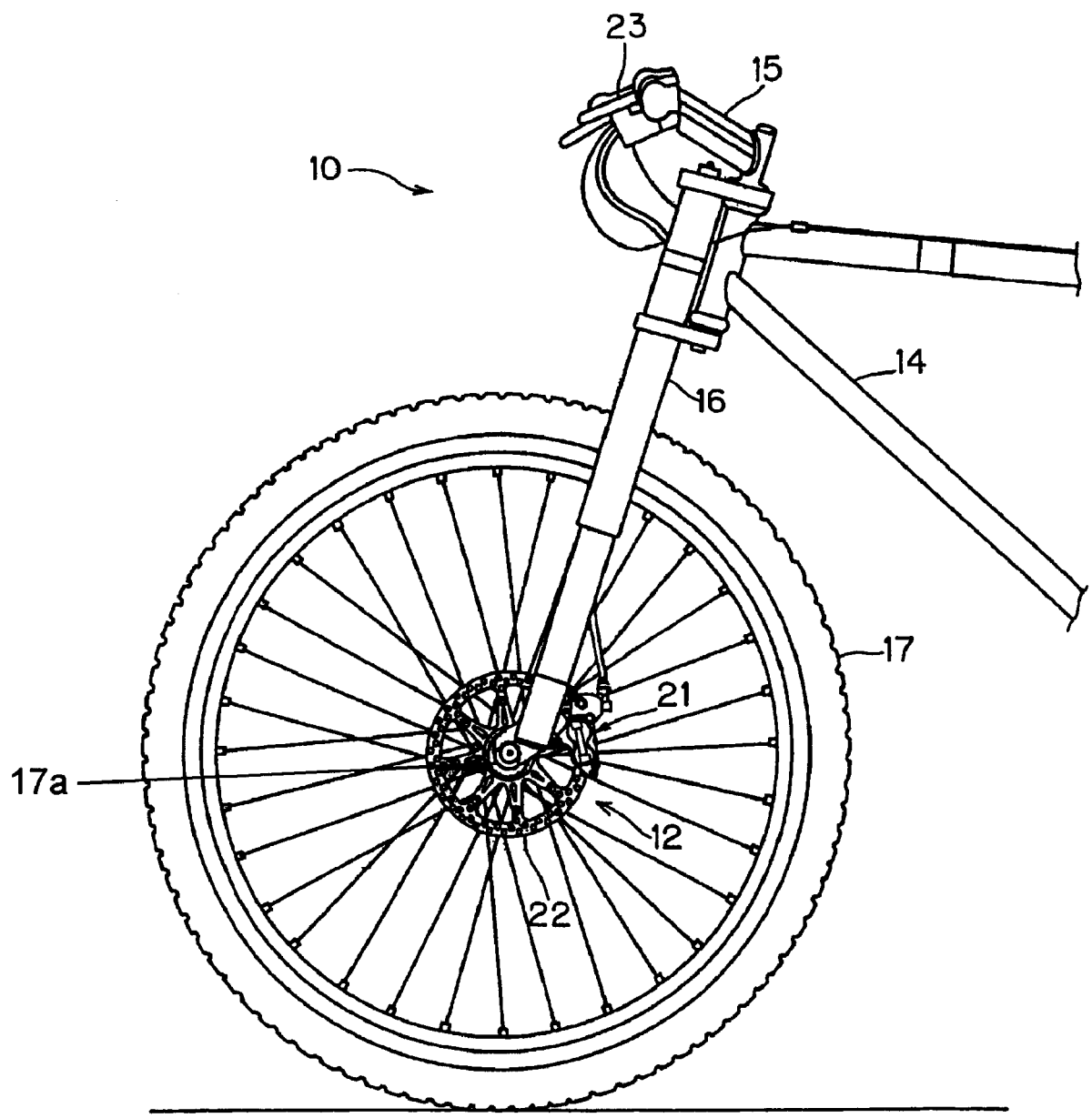
FIG. 1 is a side view of a bicycle with a particular embodiment of a disk brake apparatus.

FIG. 1 is a side view of a bicycle 10 with a particular embodiment of a complete disk brake apparatus 12. Bicycle 10 is a conventional bicycle with a frame 14 supporting a handlebar 15, front and rear forks 16 (only the front fork is shown), front and rear wheels 17 (only the front wheel is shown), and a drive device comprising a sprocket and chain (not shown). Since the structure of such a conventional bicycle is well known in the field, further description if its structure shall be omitted.

Disk brake apparatus 12 comprises a brake caliper 21 mounted on front fork 16, a brake rotor 22 attached to a hub 17a of front wheel 17 so that brake rotor 22 rotates integrally with front wheel 17, and a brake operating mechanism 23. Brake caliper 21 is attached to front fork 16 near brake rotor 22, and it applies a frictional force to brake rotor 22 in response to the operation of brake operating mechanism 23 to stop the rotation of brake rotor 22 and front wheel 17.

Figure 2:
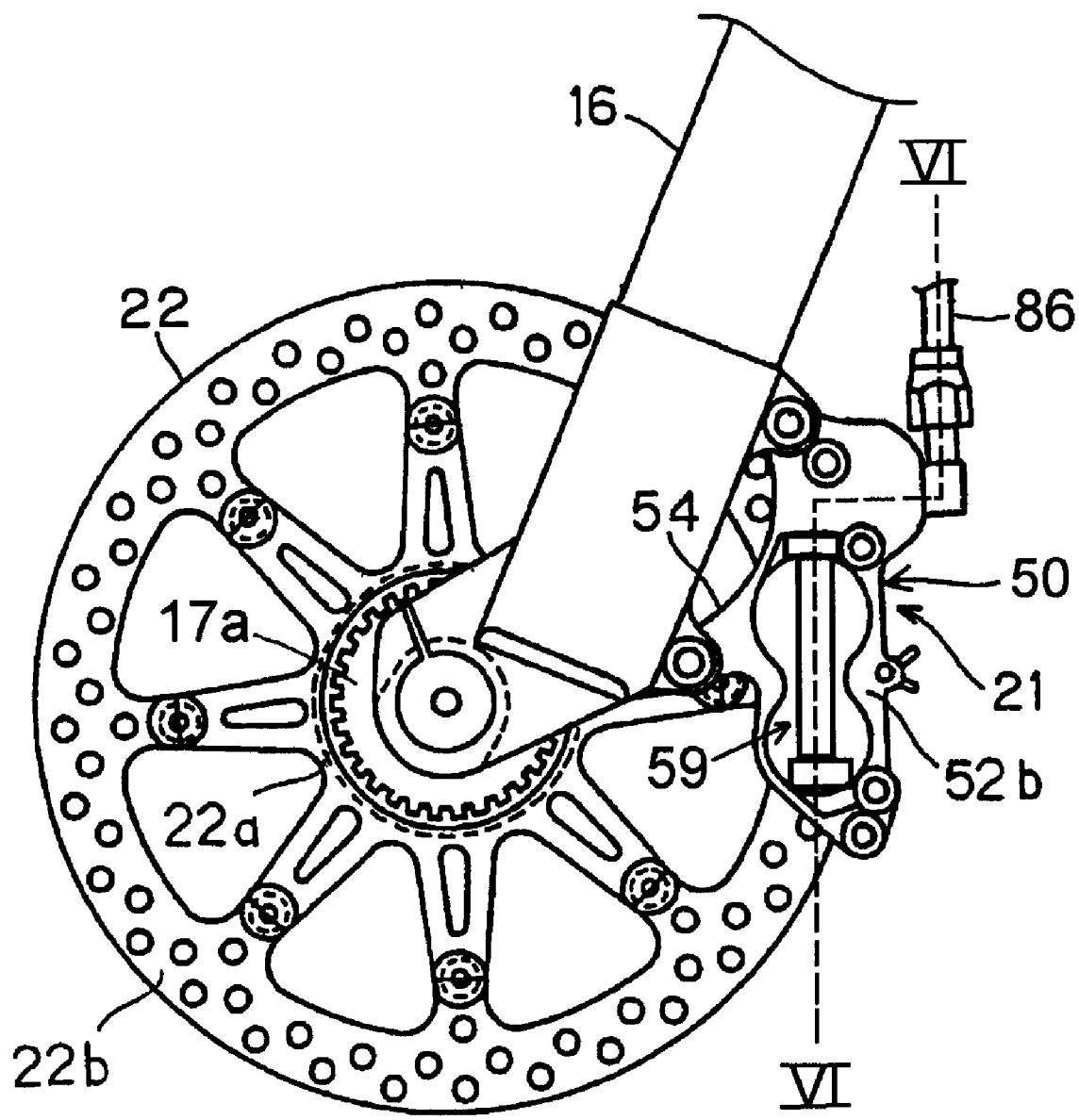
FIG. 2 is a side view of the disk brake apparatus.
Figure 3:
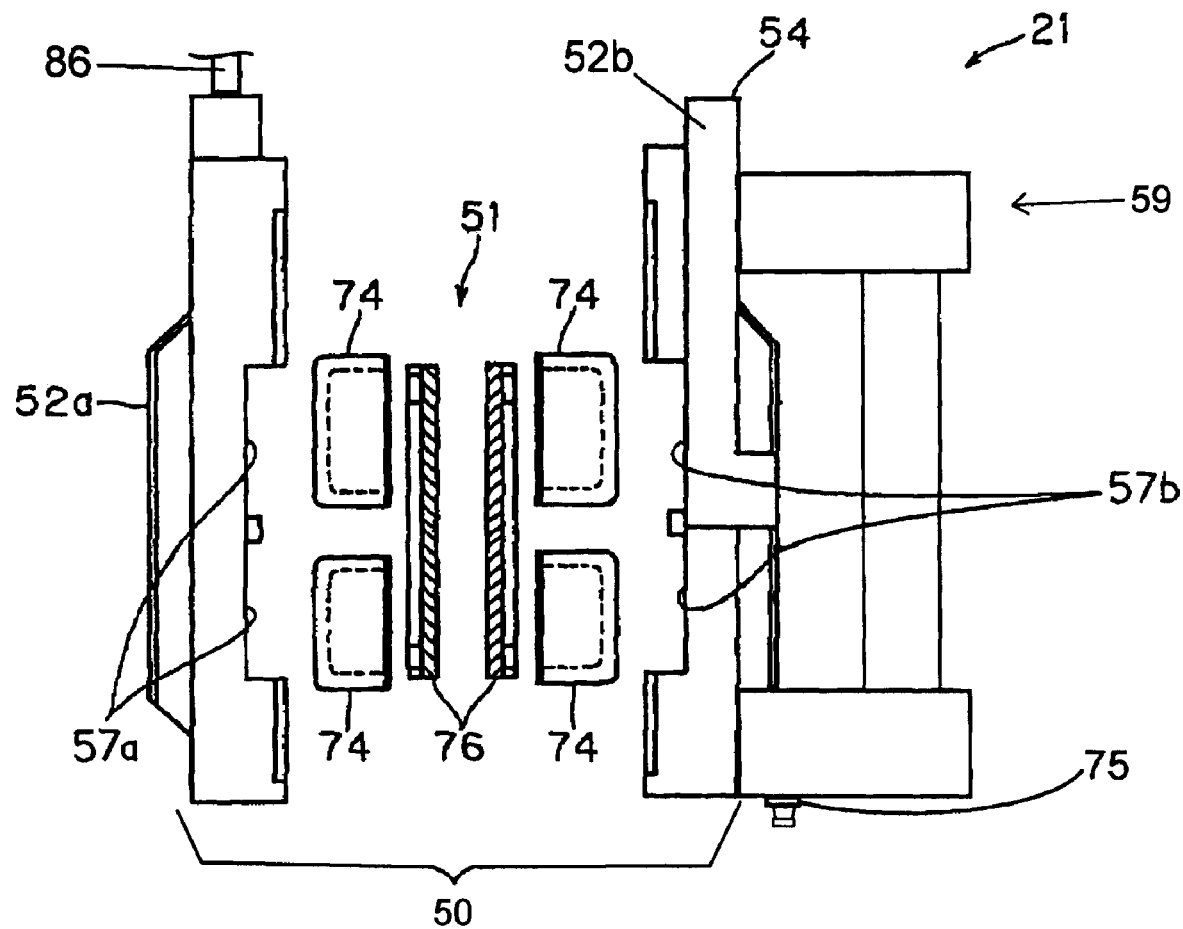
FIG. 3 is an exploded schematic view of the brake caliper assembly.

As shown in FIGS. 2 and 3, brake caliper 21 comprises a caliper housing 50 and a piston unit 51. Caliper housing 50 is constructed of a thermally conducting material such as an aluminum alloy, and it comprises a first housing member 52a and a second housing member 52b bolted together in a conventional manner to form a slot to receive brake rotor 22 therebetween. Housing members 52a and 52b have substantially the same shape, except that hydraulic tubing 86 for brake operating mechanism 23 is connected to first housing member 52a to supply brake oil to both housing members 52a and 52b. Second housing member 52b also has an outwardly extending flange that forms an attachment member 54 for bolting brake caliper 21 to front fork 16. A cooling unit 59 is attached to the side of second housing member 52b.

As shown in FIG. 3, piston unit 51 comprises four pistons 74 and a pair of brake pads 76. Pistons 74 slidably fit into piston activating spaces 57a and 57b in the form of round cylinders formed in housing members 52a and 52b so as to move between a brake release position and a brake activating position. Brake pads 76 move integrally with pistons 74. Thus, when pistons 74 move from the brake release position to the brake activating position, brake pads 76 also move from the brake release position to the brake activating position. When in the brake activating position, brake pads 76 press against and apply a frictional force to brake rotor 22 to thereby decrease or stop rotation of brake rotor 22 and front wheel 17. When in the brake release position, brake pads 76 are spaced apart from brake rotor 22, thus allowing brake rotor 22 and front wheel 17 to rotate freely.

Figure 4:
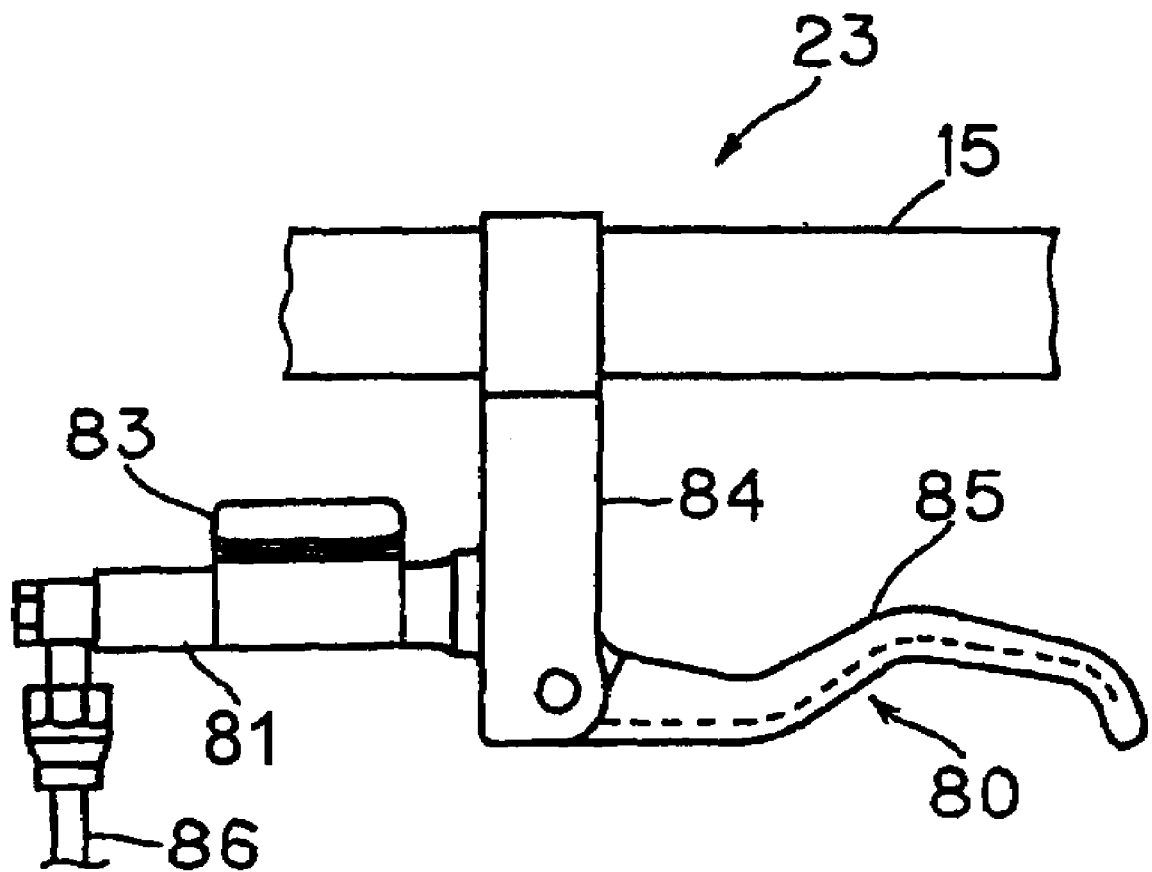
FIG. 4 is a plan view of a particular embodiment of a brake operating device.
Figure 5:
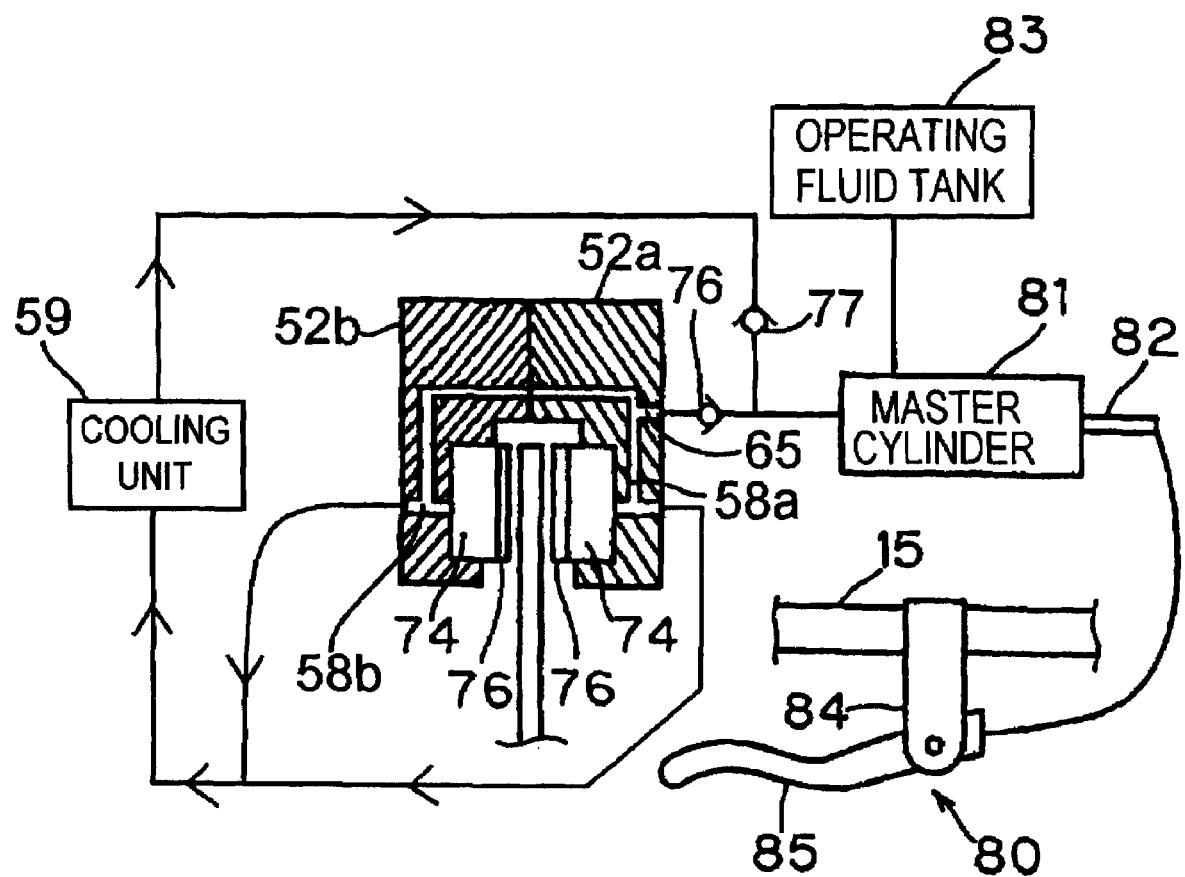
FIG. 5 is a schematic diagram of a particular embodiment of a hydraulic circuit for the disk brake apparatus.

As shown in FIGS. 4 and 5, brake operating mechanism 23 is attached to handlebar 15. Brake operating mechanism 23 comprises a brake lever assembly 80, a master cylinder 81, a piston 82, and an operating fluid tank 83. Brake lever assembly 80 comprises a bracket 84 mounted on handlebar 15 and a lever component 85 pivotably mounted on bracket 84. Bracket 84 is integrally formed with master cylinder 81, and piston 82 and operating fluid tank 83 are supported by bracket 84. Piston 82 is slidingly disposed within master cylinder 81, and operating fluid tank 83 is in fluid communication with master cylinder 81. One end of piston 82 is connected to lever component 85 so that piston 82 reciprocates inside master cylinder 81 in response to the pulling and releasing of lever component 85. Pulling lever component 85 causes pressurized oil to move through the hydraulic tubing 86 connected to brake caliper 21, the pressurized oil travels through a hydraulic inlet 65 and hydraulic passages 58a and 58b into cylindrical bores 57a and 57b, thereby moving pistons 74 and brake pads 76 to contact and apply frictional force to brake rotor 22 to brake front wheel 17.

Figure 6:
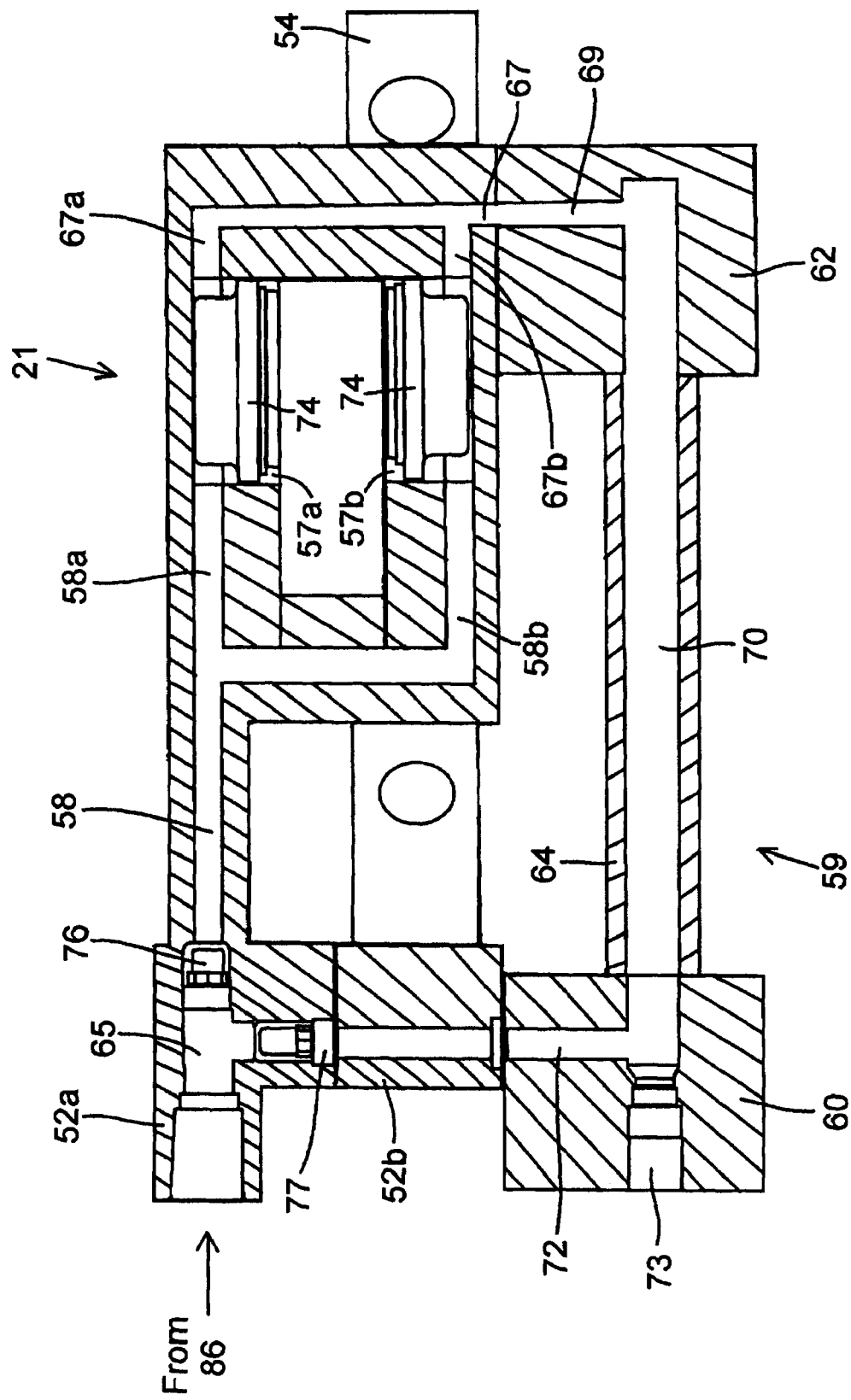
FIG. 6 is a view taken along line VI-VI in FIG. 2.

As shown in FIGS. 3 and 6, cooling unit 59 is attached to the side of second housing member 52b. Cooling unit 59 comprises mounting blocks 60, 62 and a cooling member 64. Mounting blocks 60, 62 and cooling member 64 may be formed from a heat conducting material such as aluminum, copper, etc., and in this embodiment cooling member 64 comprises a hollow pipe.

As shown in FIG. 6, the hydraulic circuit for brake caliper 21 comprises hydraulic inlet 65, a piston activating inlet 58 in fluid communication with hydraulic inlet 65 and which branches into hydraulic passages 58a and 58b to form individual piston activating inlets in fluid communication with piston activating spaces 57a and 57b, respectively, piston activating outlets 67a, 67b in fluid communication with piston activating spaces 57a, 57b, respectively, that merge into a single piston activating outlet 67, a cooling inlet 69 formed in mounting block 62 so as to be in fluid communication with piston activating outlet 67, a heat transfer space 70 formed in cooling member 64 so as to be in fluid communication with cooling inlet 69 for engaging hydraulic fluid received through cooling inlet 69 with cooling member 64, and a cooling outlet 72 formed in mounting block 60 so as to be in fluid communication with heat transfer space 70 and with hydraulic inlet 65. Cooling outlet 72 communicates hydraulic fluid from heat transfer space 70 to a location upstream of piston activating spaces 57a and 57b. An air bleeding passage 73 is formed in mounting block 60, and a conventional bleeding screw 75 (FIG. 3) is mounted in air bleeding passage 73 for bleeding air from the hydraulic circuit in a known manner.

A check valve 76 is disposed in the hydraulic circuit between hydraulic inlet 65 and piston activating inlet 58 to prevent at least a portion of hydraulic fluid that flows from hydraulic inlet 58 into piston activating spaces 57a and 57b from flowing back toward hydraulic inlet 65. In this embodiment, check valve 76 prevents a majority (e.g., substantially all) of the hydraulic fluid that flows from hydraulic inlet 58 into piston activating spaces 57a and 57b from flowing back toward hydraulic inlet 65. Another check valve 77 is disposed in the hydraulic circuit between cooling outlet 72 and hydraulic inlet 65 to prevent at least a portion of hydraulic fluid received by hydraulic inlet 65 from flowing into cooling outlet 72 when hydraulic fluid is communicated to piston activating spaces 57a and 57b to move pistons 74 from the brake release position toward the brake activating position. In this embodiment, check valve 77 prevents a majority (e.g., substantially all) of the hydraulic fluid received by hydraulic inlet 65 from flowing into cooling outlet 72 when hydraulic fluid is communicated to piston activating spaces 57a and 57b to move pistons 74 from the brake release position toward the brake activating position. Check valve 77 also prevents at least a portion of hydraulic fluid that flows from cooling outlet 72 from flowing back toward heat transfer space 70. In this embodiment, check valve 77 prevents a majority (e.g., substantially all) of hydraulic fluid that flows from heat transfer space 70 through cooling outlet 72 from flowing back toward heat transfer space 70.

As a result of either check valve 76 or 77, at least a portion of hydraulic fluid flows only one way from hydraulic inlet 65, through cooling inlet 69, and through heat transfer space 70. Since cooling inlet 69 is in fluid communication with piston activating spaces 57a and 57b in this embodiment, at least a portion of hydraulic fluid flows only one way from hydraulic inlet 65, through piston activating spaces 57a and 57b, through cooling inlet 69, and through heat transfer space 70. Given the construction of check valves 76 and 77 as noted above, a majority (e.g., substantially all) of hydraulic fluid flows only one way from hydraulic inlet 65, through piston activating spaces 57a and 57b, through cooling inlet 69, and through heat transfer space 70. As a result, cooling member 64 directly cools the hydraulic fluid used to move pistons 74 from the brake release position to the brake activating position. Every operation of brake operating mechanism 23 pumps cooled fluid into piston activating spaces 57a and 57b, and hydraulic fluid in piston activating spaces 57a and 57b heated from a previous movement of pistons 74 to the brake activating position is removed from piston activating spaces 57a and 57b and communicated to cooling member 64. Separate pumps are not required to circulate the hydraulic fluid, so the disclosed cooling system is simpler than known designs.

While the above is a description of various embodiments of inventive features, further modifications may be employed without departing from the spirit and scope of the present invention. For example, while cooling member 64 in the sample embodiment had the form of a simple hollow pipe, cooling member 64 may have a number of shapes such as a coil, an undulating passage, etc., and may include additional structures such as cooling fins, baffles, fluid (air, hydraulic, etc) passages, etc. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle brake disk caliper apparatus comprising:
   a caliper housing dimensioned and structured to be mounted to a bicycle;
   a piston operatively coupled to the caliper housing so that the piston moves between a brake release position and a brake activating position;
   a hydraulic inlet for receiving a hydraulic fluid to move the piston;
   a piston activating space in fluid communication with the hydraulic inlet so that the hydraulic fluid moves the piston from the brake release position to the brake activating position;

a cooling member;

a cooling inlet in fluid communication with the hydraulic inlet;

a heat transfer space in fluid communication with the cooling inlet for engaging hydraulic fluid received through the cooling inlet with the cooling member; and a cooling outlet in fluid communication with the heat transfer space for communicating hydraulic fluid from the heat transfer space to a location so that at least a portion of hydraulic fluid flows only one way from the hydraulic inlet, through the cooling inlet, and through the heat transfer space;

wherein hydraulic pressure that pushes against the piston to move the piston also pushes hydraulic fluid through the cooling inlet; and wherein the cooling outlet introduces the hydraulic fluid communicated from the heat transfer space to a location both upstream of the piston activating space and upstream of the hydraulic inlet.

2. The apparatus according to claim 1 further comprising a check valve located to prevent at least a portion of hydraulic fluid that flows from the cooling inlet toward the heat transfer space from flowing back through the cooling inlet.

3. The apparatus according to claim 1 further comprising a check valve located to prevent at least a portion of hydraulic fluid that flows toward the piston activating space from flowing back toward the hydraulic inlet.

4. The apparatus according to claim 1 wherein the cooling inlet is in fluid communication with the piston activating space so that the cooling member cools hydraulic fluid from the piston activating space.

5. The apparatus according to claim 4 further comprising a check valve located to prevent at least a portion of hydraulic fluid that flows from the piston activating space toward the heat transfer space from flowing back toward the piston activating space.

6. The apparatus according to claim 5 wherein the check valve is located to prevent at least a portion of hydraulic fluid that flows into the piston activating space from flowing back toward the hydraulic inlet.

7. The apparatus according to claim 6 wherein the check valve is located between the hydraulic inlet and the piston activating space.

8. The apparatus according to claim 5 wherein the check valve is located at the cooling outlet to prevent at least a portion of hydraulic fluid that flows from the heat transfer space through the cooling outlet from flowing back toward the heat transfer space.

9. The apparatus according to claim 1 wherein the cooling outlet is in fluid communication with the hydraulic inlet.

10. The apparatus according to claim 9 further comprising a check valve located to prevent at least a portion of hydraulic fluid received by the hydraulic inlet from flowing into the cooling outlet when hydraulic fluid is communicated to the piston activating space to move the piston from the brake release position toward the brake activating position.

11. The apparatus according to claim 9 further comprising a check valve located to prevent at least a portion of hydraulic fluid that flows from the hydraulic inlet into the piston activating space from flowing back toward the hydraulic inlet.

12. The apparatus according to claim 9 further comprising:

a first check valve located at the cooing outlet to prevent substantially all of the hydraulic fluid received by the hydraulic inlet from flowing into the cooling outlet when hydraulic fluid is communicated into the piston activating space to move the piston from the brake release position toward the brake activating position; and a second check valve located at an inlet to the piston activating space to prevent substantially all of the hydraulic fluid that flows from the hydraulic inlet into the piston activating space from flowing back toward the hydraulic inlet.

13. The apparatus according to claim 1 wherein the hydraulic inlet receives hydraulic fluid from a hydraulic fluid source other than the cooling outlet, and wherein the cooling outlet introduces the hydraulic fluid communicated from the heat transfer space to a location both upstream of the piston activating space and upstream of the hydraulic inlet so that hydraulic fluid communicated through the hydraulic inlet into the piston activating space comprises a mixture of the hydraulic fluid from the cooling outlet and the hydraulic fluid from the hydraulic fluid source other than the cooling outlet.

* * * * *